No. 825,217. PATENTED JULY 3, 1906.
E. N. HULL & S. E. HODGE.
MEASURING INSTRUMENT.
APPLICATION FILED AUG. 15, 1905.
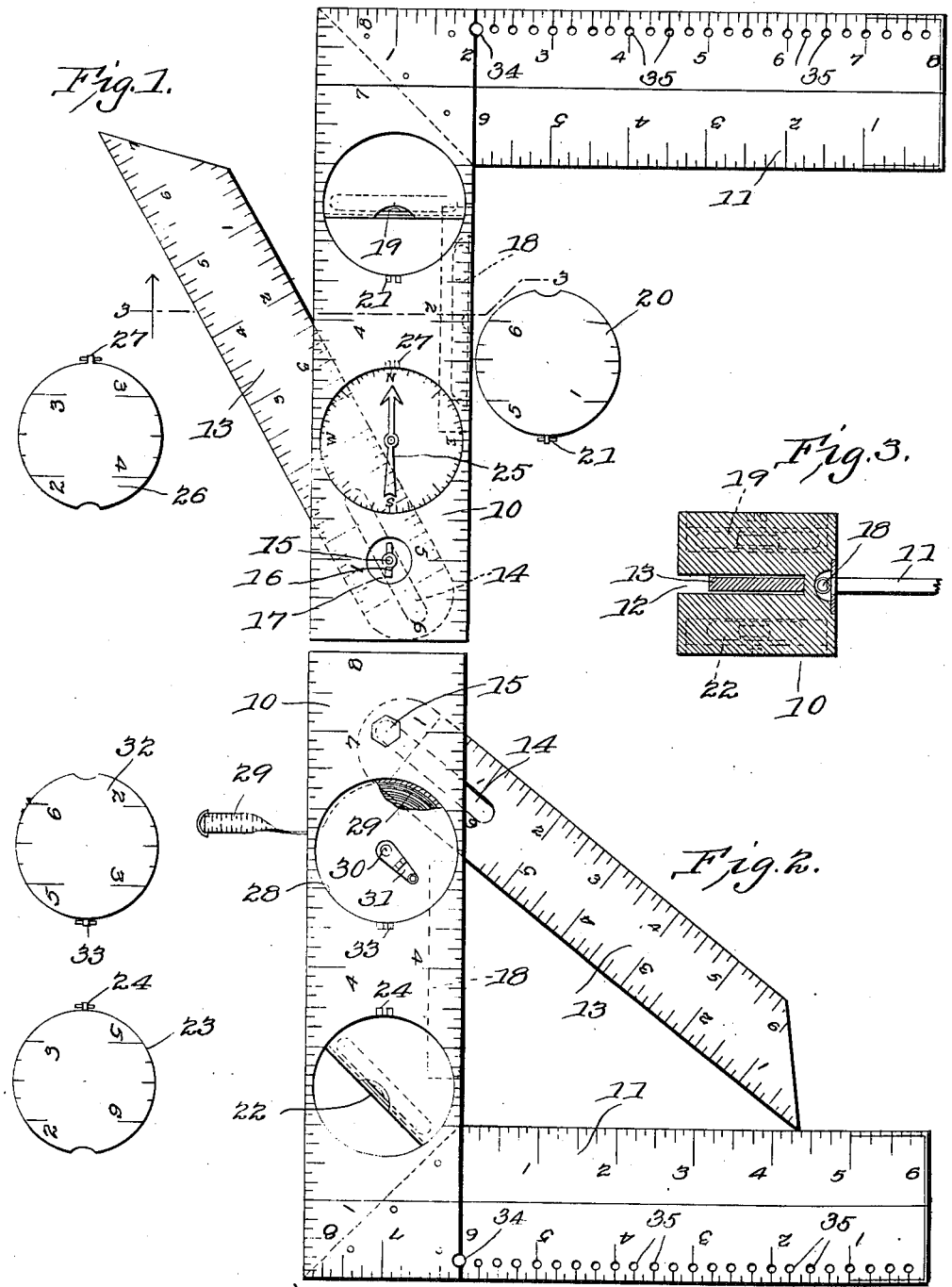
Witnesses
Ezikiel N. Hull & Samuel E. Hodge Inventors.
by C. A. Snow & Co.
Attorneys

UNITED STATES PATENT OFFICE.

EZIKIEL N. HULL AND SAMUEL E. HODGE, OF SARASOTA, FLORIDA.

MEASURING INSTRUMENT.

No. 825,217.  Specification of Letters Patent.  Patented July 3, 1906.

Application filed August 15, 1905. Serial No. 274,282.

*To all whom it may concern:*

Be it known that we, EZIKIEL N. HULL and SAMUEL E. HODGE, citizens of the United States, residing at Sarasota, in the county of Manatee and State of Florida, have invented a new and useful Measuring Instrument, of which the following is a specification.

This invention relates to measuring instruments, and has for an object to provide a device of the class embodying means for determining a direction relative to the polar north and from such determined direction determine any desired angle to the polar direction.

A further object of the invention is to provide a device of the class embodying means for determining a vertical and any desired angle to the vertical.

A further object of the invention is to provide a device of the class embodying means for determining a horizontal and any desired angle thereto.

With these and other objects in view the present invention consists in the combination and arrangements of parts, as will be hereinafter fully described, shown in the accompanying drawings, and particularly pointed out in the appended claim, it being understood that changes in the form, proportion, size, and minor details may be made without departing from the spirit of the invention or sacrificing any of its advantages.

In the drawings, Figure 1 is a view in side elevation of the improved measuring instrument. Fig. 2 is a view of the improved measuring instrument in side elevation and from the side opposite Fig. 1. Fig. 3 is a transverse sectional view of the improved measuring instrument, taken on line 3 3 of Fig. 1.

Like characters of reference designate corresponding parts throughout the several views.

In its preferred embodiment the improved measuring instrument forming the subject-matter of this application is in the form of a mechanic's square, comprising a stock 10 and perpendicular blade 11. The stock 10 is provided with a longitudinal furrow 12, which also extends entirely across at one end, and therein is mounted the bevel blade 13, having the longitudinal slot 14 and pivoted upon the pin 15, secured by the winged nut 16 within the cavity 17.

The inner edge of the stock 10 is provided with a level 18, extending longitudinally of the stock. Within one side of the stock is countersunk a level 19, disposed transversely to the stock and having a closure 20 hinged thereto at 21 and arranged to cover the depression. In the side of the stock opposite the level 19 is a countersunk level 22, disposed at an angle of forty-five degrees to the stock and having a closure 23 hinged thereto at 24 and proportioned to cover the depression.

Countersunk in one side of the stock is the pivoted magnetic needle 25, having a closure 26 hinged thereto at 27 and proportioned to cover the depression. Opposite the compass is formed a circular recess 28, in which a tape-measure 29 is wound upon a shaft 30, as by the crank-handle 31. A closure 32 is hinged at 33 and proportioned to cover the recess.

Adjacent the outer edge of the blade 11 a hole 34 is formed at one end of the scale-graduations and of a size to receive a nail by which the instrument may be pivotally secured to the work. Parallel with the same outer side is formed an alined series of openings 35, proportioned to permit the introduction of a pencil-point and arranged at regular intervals and upon scale-graduations and by the use of which circles about the hole 34 may be projected.

From the foregoing it will be obvious that the improved measuring instrument may be laid as in Fig. 1, and by a reference to the needle 25 the polar north is determined. With the stock disposed so that the needle points to north it is apparent that the blade 11 will lie in an east and west direction and that any intermediate angle may be determined by using the bevel-blade 13. By reason of the compass and the blades the instrument becomes of great value in locating the foundations of buildings, and by use of the tape-line the extent may be determined while the stock and associated parts remain stationary. By use of the several levels the foundation may be erected both plumb and horizontal, and for end and window construction the level-glass set at forty-five degrees will be found especially valuable.

Having thus described the invention, what is claimed is—

In a measuring instrument a straight stock having alining recesses therein in opposite faces, a spirit-level in each recess, said levels being disposed at fixed angles to each other and to the longitudnal center of the stock, and closures for the recesses.

In testimony that we claim the foregoing as our own we have hereto affixed our signatures in the presence of two witnesses.

EZIKIEL N. HULL.
SAMUEL E. HODGE.

Witnesses:
 GEO. W. BLACKBURN,
 C. V. S. WILSON.